Figure 1:
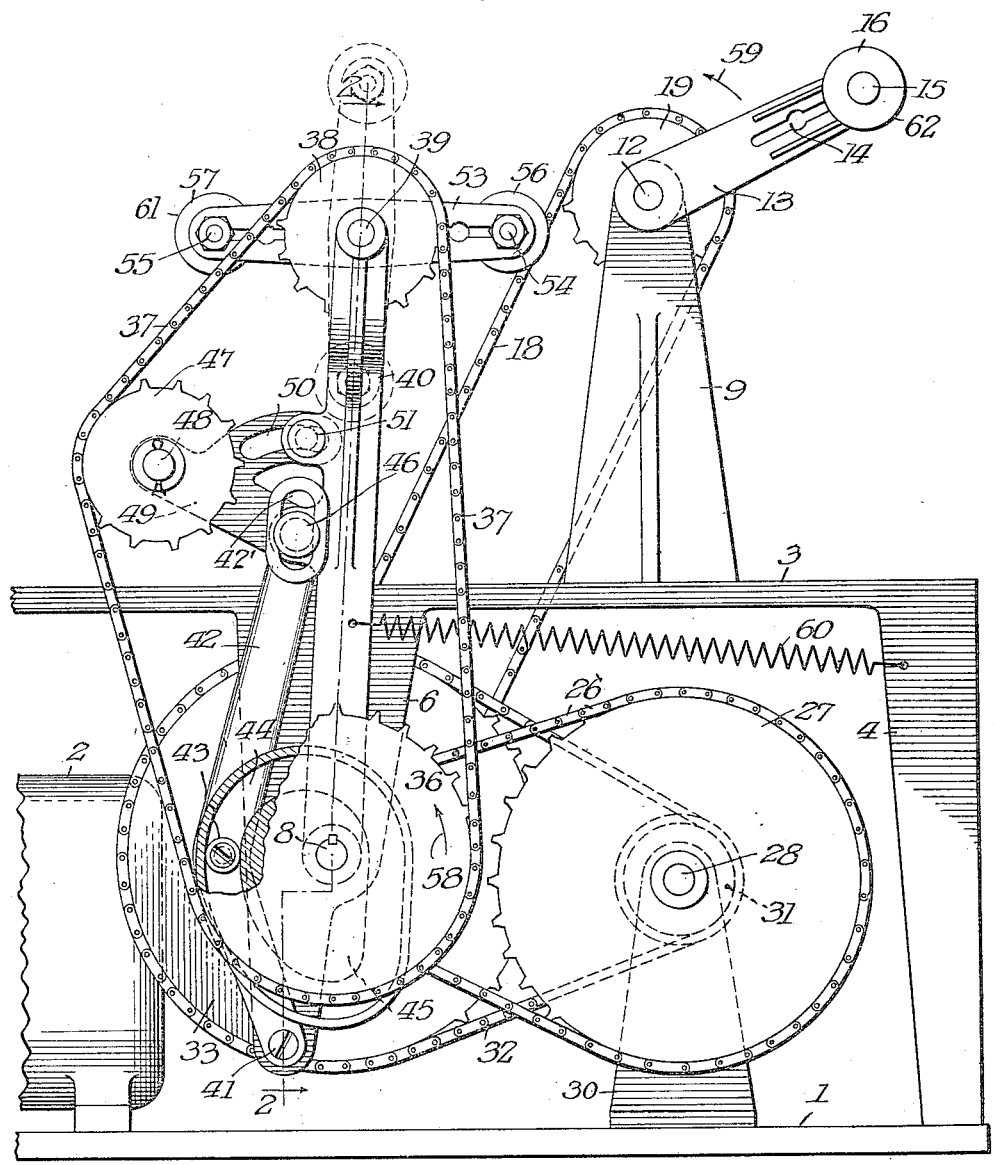

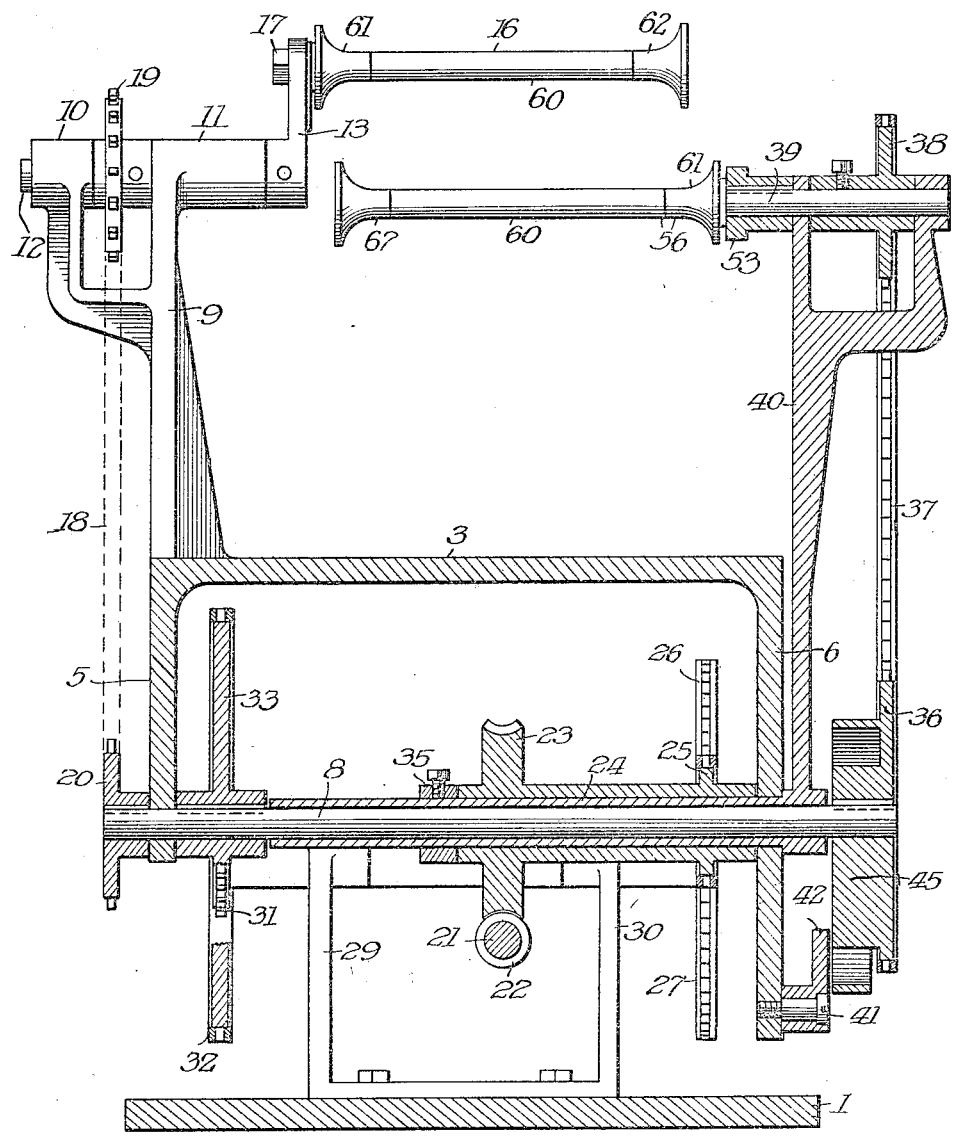

UNITED STATES PATENT OFFICE.

JOHN E. KNECHT, OF BATAVIA, ILLINOIS.

CANDY-PULLING MACHINE.

1,225,138.　　　　　Specification of Letters Patent.　　　Patented May 8, 1917.

Application filed August 31, 1916.　Serial No. 117,831.

*To all whom it may concern:*

Be it known that I, JOHN E. KNECHT, a citizen of the United States, residing at Batavia, in the county of Kane and State of Illinois, have invented a certain new and useful Improvement in Candy-Pulling Machines, of which the following is a full, clear, concise, and exact description, reference being had to the accompanying drawings, forming a part of this application.

My invention relates to a candy pulling machine.

The successful making of certain kinds of candy requires that the material be manipulated or "pulled" in order to impart to it a smooth, fine texture as distinguished from a coarse crystalline structure which it would otherwise tend to assume upon cooling.

The machine of my invention aims to secure a maximum of "pulling" of the candy for the power expended. Many of the machines with which I am familiar have a tendency to stir the candy up as distinguished from an actual pulling of the same. The action of my machine simulates the manual operation of pulling. Other and incidental objects will be apparent from the following detailed description, which, together with the accompanying drawings which form a part of the present specifications sets out an embodiment of my invention.

Figure 1 is a partial side elevation with parts broken away, and Fig. 2 is a vertical section taken on a line 2, 2 of Fig. 1. The machine which I have shown comprises a base or bed plate 1 upon which is mounted the driving motor 2 and the table or platform 3. The table or platform 3 is supported at its four corners by the legs 4 which hold it above the motor 2 and above the gears and other mechanism which are required to drive the various parts of the machine. The table or platform 3 is provided with a pair of depending lugs or brackets 5 and 6, which provide bearings for the driving shaft case.

A stationary bracket or arm 9 is mounted upon the table 3 and bears at its upper end a pair of bearings 10 and 11 for the rotatable shaft 12 which is keyed or pinned to the rotating arm 13. The rotating arm 13 is slotted as shown at 14 in Fig. 1 and a suitable pin 15 bearing a removable spool or bobbin 16 is adjustably secured to said arm 13 through the medium of slot 14 and the bolt 17. The spool or bobbin is formed of a separate, central cylindrical part 60 and flared heads or flanges 61 and 62. The separation of the spool into distinct portions is advantageous in securing an even pulling of the candy. If a lump should be formed upon one of the spool heads or flanges, the head or flange can rotate separately, thus bringing the lump into the proper place to be pulled. This feature has proven to be important in keeping the candy in the center of the spools and causing it to draw evenly. The shaft 12 and the spool 16 are adapted to rotate constantly while the machine is in operation. To this end the shaft 12 is driven by means of a chain 18 which runs over the sprocket 19 fastened on the shaft 12 and the sprocket 20 fastened on the shaft 8.

The shaft 8 is constantly driven by the motor 2 through the following mechanism. The armature shaft 21 is provided with a worm 22 which meshes with the gear 23, rotatively mounted upon the sleeve 24 over the shaft 8. The worm gear 23 is made integral with or is secured to a sprocket wheel 25 which is connected by means of a suitable chain 26 to the large sprocket gear 27 mounted upon the counter shaft 28. The counter shaft 28 has bearings in the standards 29 and 30 which are mounted upon the base or bed plate 1. The opposite end of the counter shaft 28 has secured thereto the sprocket pinion 31 that is connected by means of the chain 32 to the large sprocket gear 33 mounted upon and keyed to the shaft 8. It can thus be seen that the motor is back geared to the shaft 8 through the medium of the worm and wheel 22, 23, the sprockets 25 and 27 and the sprockets 31 and 33. As a consequence the shaft 8 rotates relatively slowly. The worm gear 23 and the small sprocket gear 25 are held in place between the bracket 6 and a collar 35 that is secured by a set screw to the sleeve 24.

As previously pointed out, the shaft 8 has secured to one end thereof the driving sprocket 20 and has secured to the opposite end thereof the driving sprocket 36, which by means of the chain 37 and the driven sprocket 38 drives the shaft 39 which has bearings in the oscillating arm 40.

The swinging arm 40 is connected to the sleeve 24 which is freely rotatable upon the shaft 8.

The depending arm or bracket 6 carries at its lower end a pin 41 upon which is pivoted a cam arm 42 that bears a pin and roller 43, playing in the cam groove 44 of the cam body 45 which is secured to or formed integral with the sprocket wheel 36 and is keyed to the shaft 8. The upper end of the cam arm 42 is slotted as shown at 42′, Fig. 1, to embrace the pin 46 which is mounted upon the oscillating arm 40.

An arm 49 is pivoted on the pin 46 to the arm 40, and carries the idler 47 rotatively mounted on the trunnion 48, and normally in engagement with the chain 37. The arm 49 is held in adjusted positions by the slot and pin 50 and 51.

The idler 47 and the arm 49 serve to keep the chain 37 at the proper degree of tension and in addition serve a very useful function in aiding the oscillating arm 40 to be moved outward during the time of pulling the candy.

The shaft 39 borne upon the upper end of the arm 40 has keyed thereto a double arm 53 which bears suitable adjustable pins 54 and 55 bearing the spools 56 and 57 respectively. The spools 56 and 57 are constructed in a manner similar to the spool 16 above described.

It can now be seen from the above description that the arm 13 is constantly rotated about its shaft 12 which is relatively stationary. The double arm 53 is rotated about its shaft 39, which is swung back and forth upon the end of the arm 40. As arm 40 is moved to the left by the steep portion of the cam 45, this cam being driven in the direction indicated by the arrow 58 of Fig. 1, the double arm 53 will be moved out sidewise without rotation, in the general position indicated in dotted line in Fig. 1, due to the fact that arm 40 is moving in the same direction of rotation as the driving sprocket 36. The arm 49 and the sprocket 47 at this time serves the very useful function of giving the sprocket 36 a very considerable leverage in swinging the arm 40 about the shaft 8. This is in addition to the force applied through the cam 45 and the cam arm 42, the combined effect of these efforts being to draw the candy outwardly and thus clearly pull the same. The arm 13 which rotates in the direction indicated by the arrow 59 of Fig. 1 at this time moves outwardly toward its outermost position. It is to be noted at this time that the worm gear 23, the sleeve 24 and the shaft 8 are all turning in the same direction, so that the minimum of friction is encountered at this time, the entire machine being designed to give a quick and powerful pull upon the candy on the left hand movement of the arm 40. When the cam 45 begins to drive the arm 40 back toward the standard 9 the double arm 53 is rotated quite rapidly and is given two or three turns while the arm 13 is approaching, thus balling up the candy upon the spools 56 and 57, so that as the arm 13 passes down and begins to move to the right it will pass between the spools 56 and 57 and will begin to pull toward the right at the same time that the arm 40 begins to move to the left. It will be readily apparent that upon a movement of the arm 40 to the left the main shaft, worm gear 23, and sleeve 24 will rotate in unison, but upon a return or movement to the right of the arm 40 the sleeve 24 will rotate in a direction counter to that of said shaft and worm gear. Movement of the arm 40 to the right is assisted by a coil spring 60 or the like, one end of the spring being anchored to some stationary part of the machine, for instance, one of the legs 4. The load upon the machine is thus equalized in view of the fact that the greater friction is encountered upon the return movement of the arm and due to the fact that the double arm 53 is rotated quite rapidly upon the return movement.

It can be seen from the above that a smoothly operating machine is produced. The candy is first pulled outwardly in a quick, even stroke and then is balled up or wound about the two spools 56 and 57, after which the spool 16 passes between them and again pulls the candy out with a smooth, quick movement.

The double arm 53 preferably does not rotate during the outward movement of the cam arm due to the fact that this arm is given substantially the same speed of angular movement as the driving sprocket. When the outermost position has been reached and the arm begins to move back the double arm 53 makes about two or three or more quick turns, thus effectively rolling the candy all up between the two spools 56 and 57. At this stage the spool on the arm 13 is in the position nearer the double arm 53 and passes midway between the spools 56 and 57, which become still and swing with the arm 40 to the left at the same time that the arm 13 swings to the right due to its rotation.

It can be seen from the above that my invention provides a novel method of manipulating the candy. The candy is suspended between the two crank pins or spools 56 and 57, then the single crank pin 16 is passed between the two supports and simultaneously the double pin crank arms and the single pin crank arms are separated from each other, so that the pin 16 performs almost a straight draw from between the two pins 56 and 57. Thereafter these supports are caused to approach each other and at the same time the pins 56 and 57 are rotated to wind the loop or bight of candy which has been formed by the pulling, upon the two supports, so that the candy is again balled or wound upon the two supports in the form of a skein.

It is apparent that this manner of operation may be embodied in other means than that which I have shown and described.

I do not intend to be restricted to the forms, dimensions, proportions or the details shown and described except as the same appear in the appended claims.

I claim:

1. In combination a shaft adapted to be constantly rotated, a crank arm bearing a pin, adapted to be rotated by said shaft, a second shaft adapted to be rotated intermittently, a double crank arm on said shaft, said arm having a pair of diametrically spaced pins thereupon, and means for causing said second shaft alternately to approach toward and recede from said first shaft.

2. In combination a single pin crank arm adapted to be constantly rotated, a double pin crank arm adapted to be intermittently rotated and means for causing said second crank arm alternately to approach and recede with respect to said first crank arm, said second crank arm being rotated while approaching said first crank arm.

3. In combination a single pin crank arm adapted to be constantly rotated on a stationary axis, a double pin crank arm mounted on a movable axis and adapted to be rotated at a greater speed than said single crank arm and means for causing said pin of the single crank arm to pass between the pins of the double crank arm.

4. In combination, a single pin crank arm adapted to be constantly rotated and mounted on a stationary axis, a double pin crank arm adapted to be intermittently rotated and mounted on a movable axis, the single pin crank passing between the pins of the double crank, means to rotate both the single and double pin crank arm and means to rectilinearly move said double crank away from the single crank during a cessation of movement of said double crank, said double crank being returned toward the single crank along the same path.

5. In combination a single pin crank arm adapted to be constantly rotated, a double pin crank arm of approximately the same radius adapted to be rotated at a greater speed than said single crank arm, means for causing said pin of the single crank arm to pass between the pins of the double crank arm and means for imparting a relative motion of translation to one of said crank arms with respect to the other.

6. In combination a single pin crank arm, a driving shaft therefor, a double pin crank arm, a driving shaft therefor, a swinging lever having bearings for said latter shaft, means for constantly rotating said first shaft and means for periodically rotating said second shaft, said means comprising a cam for moving said swinging lever to and fro.

7. In combination a frame, a stationary arm mounted on said frame, a shaft having bearings in said stationary arm, a single pin crank arm connected to said shaft, a shaft for driving said crank shaft, said second shaft being supported in said frame, a swinging arm mounted on said second shaft, said arm bearing a shaft rotatable in the upper end thereof, a double pin crank arm secured to said latter shaft, said latter crank shaft being adapted to be driven by said second shaft and cam means mounted on said second shaft for moving said swinging arm to and fro.

8. In combination a main frame, a main shaft passing through said frame, a stationary arm mounted on said frame, a crank shaft having a single pin crank arm, said crank shaft being mounted in said stationary arm, driving means connecting said main shaft and said crank shaft, a swinging arm, a crank shaft in said swinging arm, said crank shaft having a double pin crank arm thereupon, driving means connecting said main shaft and said last mentioned crank shaft, driving means for said main shaft and cam means on said main shaft for operating said swinging arm.

9. In a device of the class described, the combination of a main frame having a prime mover thereon, a main driving shaft mounted in said frame, a sleeve on said shaft, an oscillating arm carried by one end of the sleeve, a second sleeve mounted on said first sleeve, a counter shaft carried in said frame, means connecting said second sleeve with the prime mover, means connecting said second sleeve with the counter-shaft, means connecting the counter-shaft with said main shaft to drive the latter, a standard on the frame, coöperating candy manipulating members carried by the standard and said oscillating arm, means to actuate said arm, and means connecting said candy manipulating members with the prime mover to impart relative movement thereto.

10. In combination a frame, a main shaft secured to said frame, a swinging arm mounted on said shaft, a sprocket gear mounted on said main shaft, a sprocket pinion mounted on the outer end of said swinging arm, an adjustable arm projecting laterally from said swinging arm, an idler mounted on said lateral arm and a driving chain passing over said gear, said sprocket pinion and said idler and cam means to move said arm slowly on one stroke and rapidly on the opposite stroke.

11. In a device of the class described, the combination of a main frame having motion transmitting means thereon, a main drive shaft, an oscillating arm loosely pivoted on said shaft, a sprocket mounted upon and rotatable with said shaft, means operatively connected to the shaft to oscillate said arm, a rotatable candy engaging crank having a fixed axis, a double rotatable crank carried by the upper end of said oscillating arm and means to drive said second crank from said main shaft.

12. In a candy pulling machine, a swinging arm, a crank pin on said arm and a spool on said crank pin, said spool comprising a separate cylindrical portion and a pair of flanges or heads, said cylindrical portion and said heads being separately revoluble upon said crank pin with respect to each other.

In witness whereof, I hereunto subscribe my name this 26th day of August, A. D. 1916.

JOHN E. KNECHT.

Copies of this patent may be obtained for five cents each, by addressing the "Commissioner of Patents, Washington, D. C."